(12) United States Patent
Whitehead

(10) Patent No.: US 9,071,062 B2
(45) Date of Patent: Jun. 30, 2015

(54) SYSTEMS AND METHODS FOR DIPOLE ENHANCED INDUCTIVE POWER TRANSFER

(75) Inventor: Lorne A. Whitehead, Vancouver (CA)

(73) Assignee: The University of British Columbia, Vancouver (CA)

( * ) Notice: Subject to any disclaimer, the term of this patent is extended or adjusted under 35 U.S.C. 154(b) by 846 days.

(21) Appl. No.: 13/203,404

(22) PCT Filed: Feb. 26, 2010

(86) PCT No.: PCT/CA2010/000252
§ 371 (c)(1),
(2), (4) Date: Aug. 25, 2011

(87) PCT Pub. No.: WO2010/096917
PCT Pub. Date: Sep. 2, 2010

(65) Prior Publication Data
US 2011/0304220 A1     Dec. 15, 2011

Related U.S. Application Data

(60) Provisional application No. 61/155,886, filed on Feb. 26, 2009.

(51) Int. Cl.
*H01F 27/42*     (2006.01)
*H02J 5/00*      (2006.01)
(Continued)

(52) U.S. Cl.
CPC ............... *H02J 5/005* (2013.01); *H02J 17/00* (2013.01); *H01F 21/08* (2013.01); *H01F 2003/103* (2013.01); *H04B 5/0087* (2013.01)

(58) Field of Classification Search
CPC ........................................................ H02J 17/00
USPC ............................................................ 307/104
See application file for complete search history.

(56) References Cited

U.S. PATENT DOCUMENTS 5,945,762 A * 8/1999 Chen et al. ................. 310/171
6,281,611 B1 * 8/2001 Chen et al. ................. 310/171
(Continued)

FOREIGN PATENT DOCUMENTS

| CN | 2746647 | 12/2005 |
| CN | 201113411 | 9/2008 |
| JP | H10-323006 | 12/1998 |

OTHER PUBLICATIONS

International Preliminary Report on Patentability (Chapter I of the Patent Cooperation Treaty), Search Report for application PCT/CA2010/000252, Report dated Aug. 30, 2011.*
(Continued)

*Primary Examiner* — Daniel Cavallari
(74) *Attorney, Agent, or Firm* — Todd A. Rattray; Oyen Wiggs; Green & Mutala LLP

(57) ABSTRACT

An inductive power transfer apparatus is disclosed. A transmitter generates a first time varying magnetic field. A receiver is separated from the transmitter by a gap, but is located with the first time varying magnetic field. The receiver comprises: a conductor; and a receiver magnet located in the first time varying magnetic field and supported for movement in response to the first time varying magnetic field. The conductor and receiver are positioned relative to one another such that movement of the receiver magnet creates a second time-varying magnetic field in a vicinity of the conductor to thereby induce current in the conductor.

38 Claims, 7 Drawing Sheets

(51) Int. Cl.
*H02J 17/00* (2006.01)
*H01F 21/08* (2006.01)
*H04B 5/00* (2006.01)
*H01F 3/10* (2006.01)

(56) References Cited

U.S. PATENT DOCUMENTS

| | | |
|---|---|---|
| 6,288,519 B1 | 9/2001 | Peele |
| 6,489,874 B2 | 12/2002 | Katsura et al. |
| 6,515,878 B1 | 2/2003 | Meins et al. |
| 6,603,284 B2 | 8/2003 | Peele |
| 6,798,716 B1 | 9/2004 | Charych |
| 6,906,495 B2 | 6/2005 | Cheng et al. |
| 6,960,968 B2 | 11/2005 | Odendaal et al. |
| 7,042,196 B2 | 5/2006 | Ku-Lai et al. |
| 8,373,514 B2 * | 2/2013 | Cook et al. ............... 331/157 |
| 2001/0045785 A1 * | 11/2001 | Chen et al. ............... 310/104 |
| 2003/0030342 A1 * | 2/2003 | Chen et al. ............... 310/102 R |
| 2003/0171792 A1 | 9/2003 | Zarinetchi et al. |
| 2007/0024238 A1 | 2/2007 | Nakade et al. |
| 2011/0309685 A9 * | 12/2011 | Cook et al. ............... 307/104 |

OTHER PUBLICATIONS

Li, High Efficiency Wireless Power Transmission at Low Frequency Using Permanent Magnet Coupling, Thesis, The University of British Columbia, Aug. 2009.
Karalis et al., Wireless Non-Radiative Energy Transfer, Center for Materials Science and Engineering and Research Laboratory of Electronics—submitted Nov. 7, 2006.
South Korean bus prototypes use road to recharge, http://news.cnet.com/8301-11128_3-10465957-54.html—dated Mar. 9, 2010.
Karalis et al., Efficient wireless non-radiative mid-range energy transfer, Annuals of Physics, vol. 323, No. 1, pp. 34-38, Jan. 2008—submitted Feb. 6, 2007.

* cited by examiner

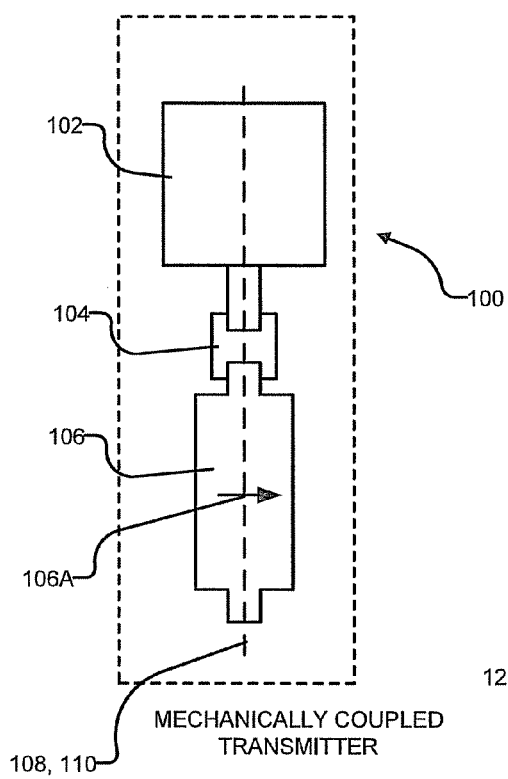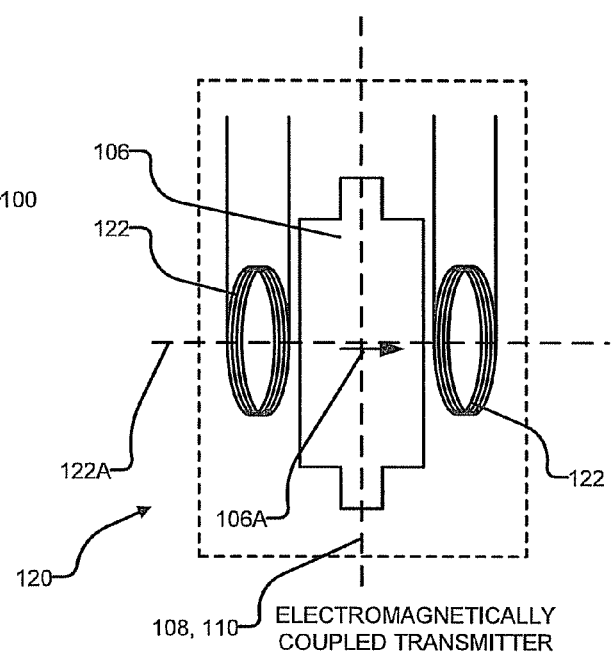
FIGURE 7A
FIGURE 7B

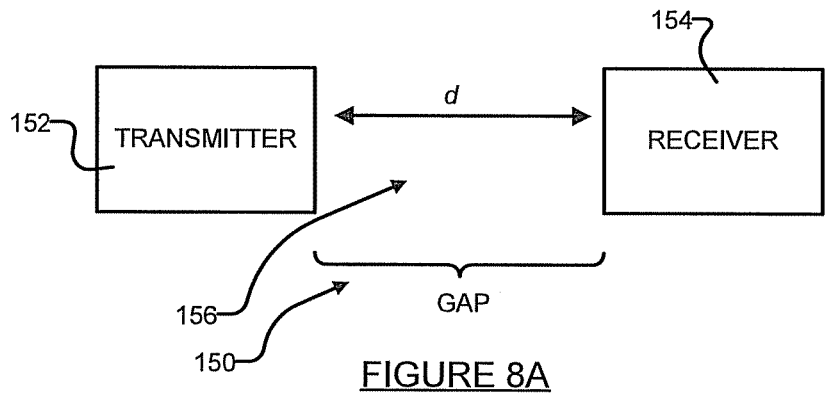
FIGURE 8A
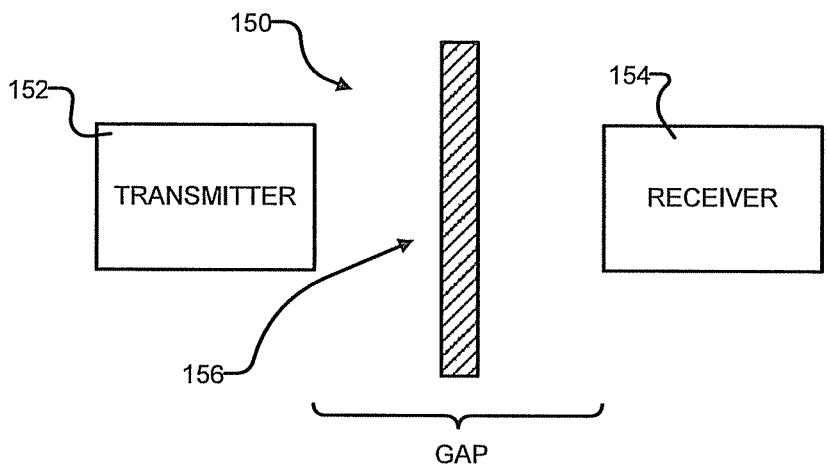
FIGURE 8B
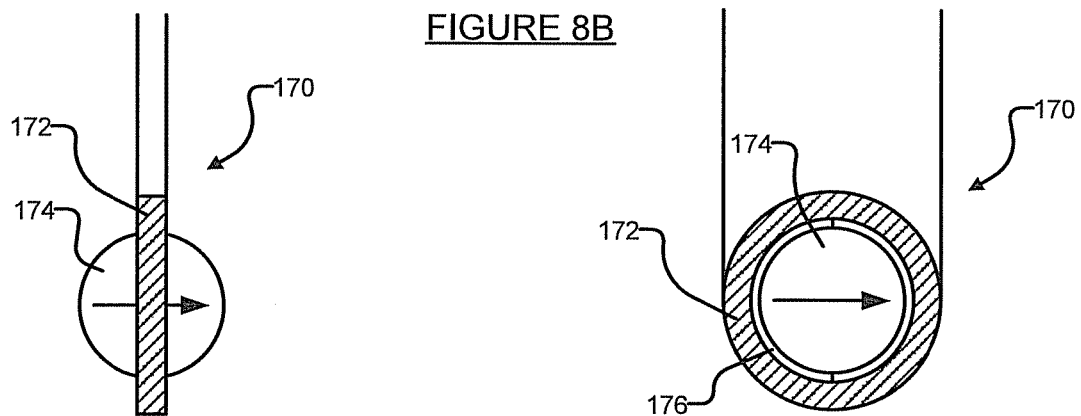
FIGURE 9A                    FIGURE 9B

SYSTEMS AND METHODS FOR DIPOLE ENHANCED INDUCTIVE POWER TRANSFER

RELATED APPLICATIONS

This application claims the benefit of the priority of U.S. application No. 61/155,886 filed on 26 Feb. 2009 which is hereby incorporated herein by reference.

TECHNICAL FIELD

This disclosure concerns low frequency inductive power transfer from one location to another, through the use of field enhancement derived from permanent magnets.

BACKGROUND OF INVENTION

It is well known that power can be wirelessly conveyed from one place to another using the Faraday effect, whereby a changing magnetic field causes an electrical current to flow in an electrically isolated secondary circuit.

Such power transfer is reasonably efficient, given highly efficient coupling between the primary coil which creates the changing magnetic field and the secondary coil that is acted upon by the changing magnetic field. Normally, such coupling is achieved by placing the coils in extreme proximity to one another, but in some cases such placement may be impossible or undesirable. The coils' coupling efficiency can be reasonably high even without extreme proximity, if the coils resonate with a high Q at the same frequency—a phenomenon which has been applied in transdermal power supplies for biomedical implants and which is being investigated in relation to battery chargers for small appliances such as cellular telephones.

It is impractical for Q to be much greater than 100, and even in that case it is necessary to employ RF frequencies, which is of potential concern, due to the lack of long-term epidemiological studies of possible medical side effects associated with time-varying fields. Generally, there is strong evidence that low frequency magnetic fields are not harmful. It is accordingly desirable to achieve high power transmission efficiency at lower frequencies.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIGS. 7A and 7B respectively depict an inductive power transmitter incorporating a mechanically driven permanent magnet and an inductive power transmitter incorporating an electromagnetically drive permanent magnet according to particular embodiments of the invention.

FIG. 8A schematically depicts a power transmitter and receiver separated by an air gap.

FIG. 8B schematically depicts a power transmitter and receiver separated by a non-magnetic barrier.

FIGS. 9A and 9B are respectively side and front elevation views of a rotatable magnet proximate to a coil, with a small gap separating the magnet from the coil.

DETAILED DESCRIPTION

Figure 1:
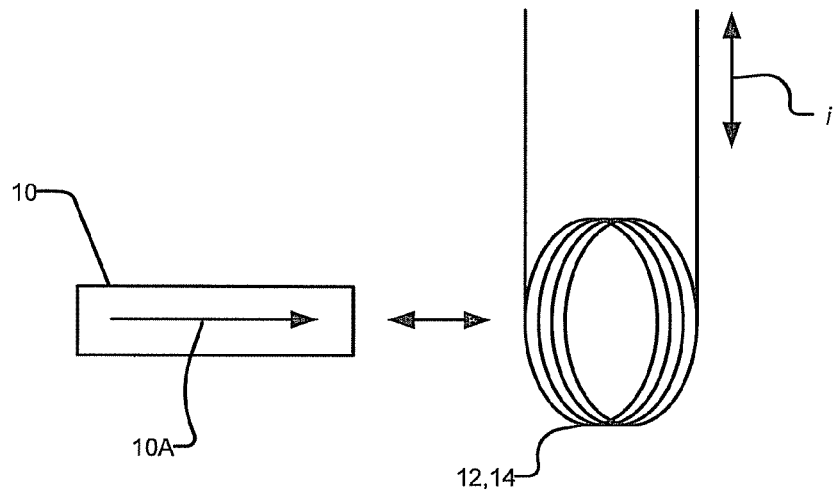
FIG. 1 is a prior art schematic depiction of a magnet which is moved relative to a coil, inducing electrical current to flow through the coil.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense. Before the embodiments of the invention are explained in detail, it is to be understood that the invention is not limited in its application to the details of construction and the arrangements of the operative components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including" and "comprising", and variations thereof, is meant to encompass the items listed thereafter and equivalents thereof. Unless otherwise specifically stated, it is to be understood that steps in the methods described herein can be performed in varying sequences.

Figure 2:
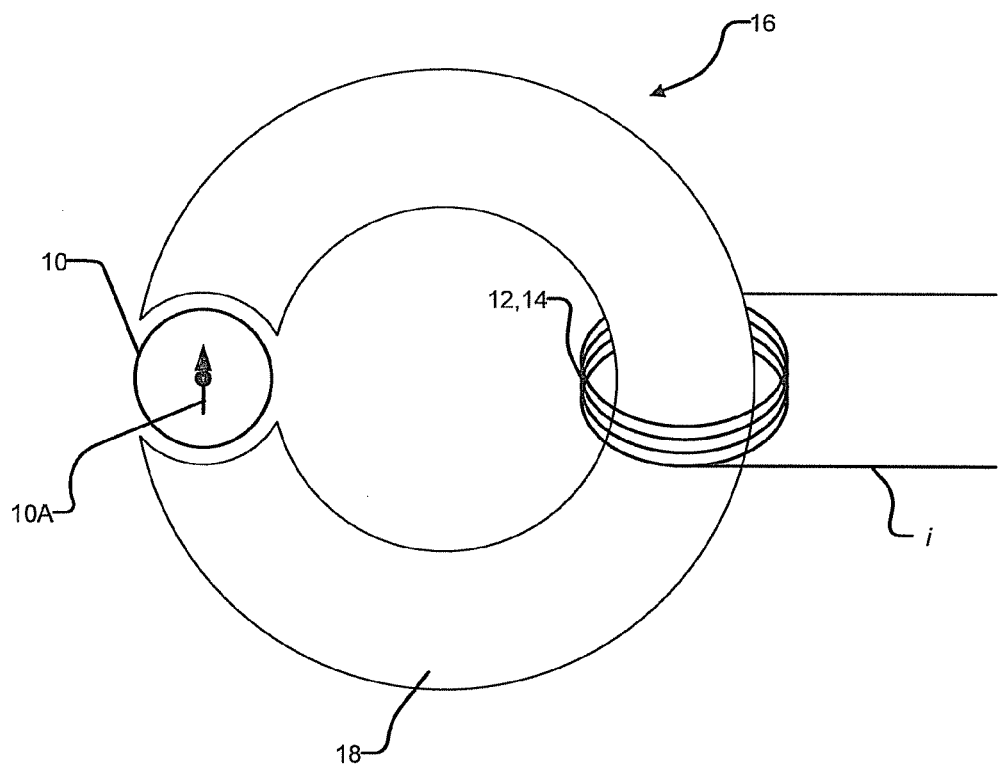
FIG. 2 is a prior art schematic depiction of an AC generator.

As depicted in FIG. 1, it is well known that a changing magnetic field, such as is generated by the oscillatory motion of a dipole magnet 10 having a diple vector 10A in the vicinity of a coil 12 of an electrical conductor 14, will induce an alternating electric current (AC) i to flow in conductor 14. This concept is employed in most electrical generators. A conventional generator 16 is shown schematically in FIG. 2, wherein magnet 10 is typically surrounded by a crescent-shaped piece of soft iron 18 having high permeability, to provide a return path for the magnetic field lines. The magnetic flux is enhanced if the soft iron 18 passes through a coil 12, thus generating an alternating electric current i which flows through the coil.

Figure 3:
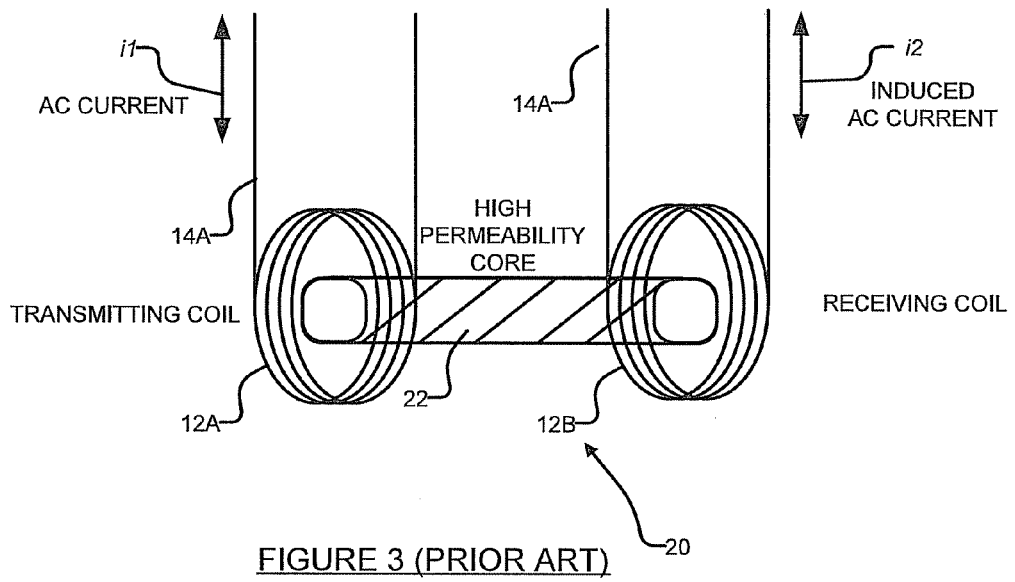
FIG. 3 is a prior art schematic depiction of inductive power transfer between two coils (e.g. of a transformer).

FIG. 3 schematically depicts a configuration for inductive power transfer between two coils 12A, 12B (e.g. of a transformer 20). It is also well known that an alternating current $i_1$ (for example having a frequency of 60 Hz) which flows through a "transmitter" coil 12A will generate a changing magnetic field in the vicinity of transmitter coil 12A and that this changing magnetic field will induce an alternating electric current $i_2$ of the same frequency to flow in a nearby "receiver" coil 12B, albeit with low power transfer efficiency. Like generator 16 of FIG. 2, transformer 20 may incorporate a core 22 of high permeability material (e.g. soft iron) which may serve to enhance the magnetic flux created by transmitter coil 12A that is experienced by receiver coil 12B.

Figure 4:
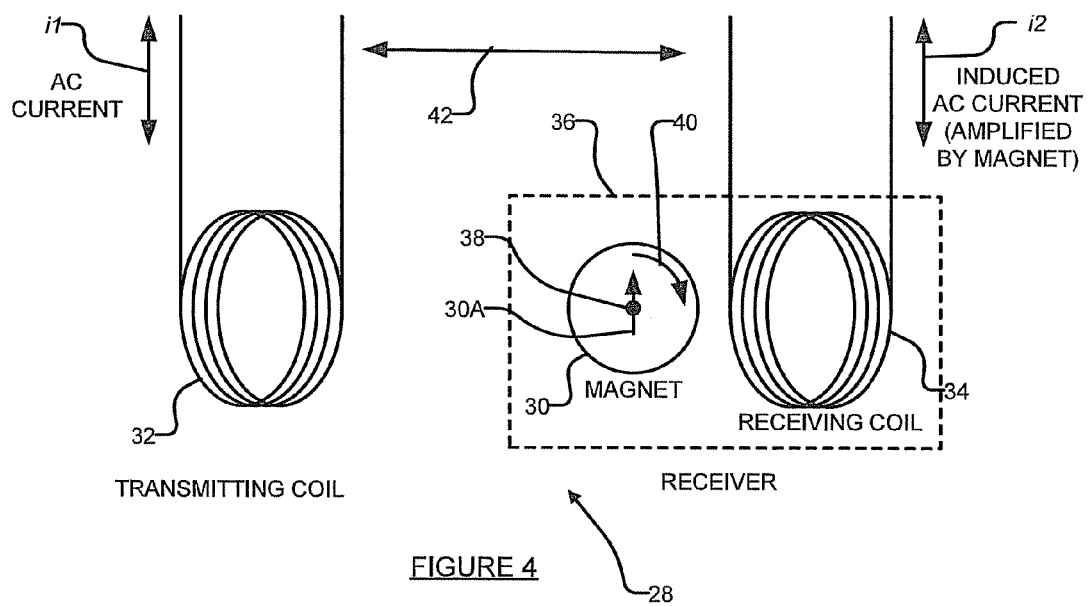
FIG. 4 schematically depicts the use of a rotating magnet to enhance inductive power transfer between two coils.

FIG. 4 schematically depicts a contactless power transfer system 28 which uses a rotating magnet 30 to enhance inductive power transfer between a transmitter coil 32 and a receiver coil 34 according to a particular embodiment of the invention. Magnet 30 and receiver coil 34 may form part of a receiver 36 (shown in dotted outline) wherein magnet 30 is supported in a position relatively close to receiver coil 34. Receiver 36 may be located in the time-varying magnetic field created by the AC current $i_1$ in transmitter coil 32. Receiver 36 may also be spaced apart from transmitter coil 32 by a relatively substantial gap 42. As will be explained in more detail below, gap 42 may be relatively large in comparison to the gaps associated with inductive power transfer in known transformers. Also, unlike conventional transformers, gap 42 may be, and for most efficient operation should be, free of (or have a limited amount of) high permeability material(s) and/or electrically conductive material(s).

In the illustrated embodiment, magnet 30 comprises a permanent dipole magnet oriented with its magnetic dipole vector 30A in the plane of the page and is supported to permit rotation (as shown by curved arrow 40) about a rotational axis 38 extending into and out of the page. For example, magnet 30 may be provided by a permanent magnet comprising: neodymium, which has relatively high dipole strength per unit volume; or ferrite, which has the advantage of no conductivity which avoids eddy current losses in the magnet itself. There are many other magnetic materials which in some circumstances may provide advantageous combinations of cost, dipole density, mass density, conductivity, tensile strength, etc., and indeed it may be advantageous to employ a hybrid construction combining various magnetic and perhaps non-magnetic materials to optimize overall performance according to the ranking of various criteria in various applications. Magnet 30 may be mounted for rotational movement using low-friction rotational bearing (not shown). In other embodiments, magnet 30 may be supported for oscillatory motion in which case axis 38 may be an oscillation axis 38. In such oscillatory embodiments, magnet 30 may be mounted using one or more elastically flexible mounts (e.g. springs, elastomeric elements, other suitably configured bias elements or the like). By rotating or oscillating in synchronization with the time-varying magnet field created by current $i_1$ in transmitter coil 32, magnet 30 can substantially increase the power transfer efficiency between transmitter coil 32 and receiver coil 34, effectively amplifying the power transmitted to the receiving coil.

The power amplification effect of rotating/oscillating magnet 30 is counterintuitive, for two reasons. First, many skilled persons would initially incorrectly conclude that due to conservation of energy, such increased power transfer efficiency could not occur. However that conclusion is incorrect, since the power increase in the receiver 36 (i.e. receiver coil 34 and magnet 30) is derived from increased power drawn from the transmitter (i.e. transmitter coil 32). Second, many skilled persons having a sophisticated understanding of magnetic coupling by means of high permeability materials (e.g. soft iron 18 shown in generator 16 of FIG. 2 and core 22 of transformer 20 of FIG. 3) would incorrectly assume that such increased power transfer efficiency could not occur since it is well known that magnetic coupling with high permeability materials does not work well across a substantial gap 42, as is depicted in FIG. 4.

More particularly, many skilled persons would consider rotating/oscillating permanent magnet 30 depicted in FIG. 4 to be analogous to a high permeability magnetic material (since both permanent magnets and high permeability materials have the property that their magnetization can be easily aligned—even by a weak magnetic field). However, the effect of a gap is completely different with an inductive coupler incorporating high permeability material (as used in core 22 of transformer 20 (FIG. 4)), due to the well known demagnetizing field, whereby magnetization in one portion of a high permeability material produces magnetic fields that create opposing magnetization in other portions of the material. This is not a problem if the permeable material forms a complete toroid-like path of approximately constant cross-sectional area, as is the case in some transformers. But a large gap in a high permeability path can create a demagnetizing effect which can very substantially reduce the overall degree of magnetization and corresponding magnetic flux through the receiver coil.

An example of the effect of a demagnetizing field is the often-studied case of a separate sphere of high permeability material located in a uniform ambient magnetic field. It is well known that no matter how high the permeability may be, the magnetic field inside the sphere is never more than a factor of 3 times the applied ambient field. This limitation can be viewed as resulting from the tendency of high permeability material to become divided into multiple magnetic domains. This tendency of high permeability materials can be eliminated or at least mitigated through the use of a permanent magnetic material (e.g. magnet 30 of FIG. 4) that is supported to facilitate movement (e.g. to rotate or oscillate) under the influence of an externally applied magnetic field.

Permanent magnets may have a dominant domain (or even one single domain) and may therefore have a relatively low susceptibility to the demagnetization effect. In contrast to the case of a high permeability material, the magnetic field of a permanent magnet may be several orders of magnitude greater than an externally applied magnetic field. In the case of the FIG. 4 power transfer system 28, the magnetic field of permanent magnet 30 (which may vary in time with the rotational/oscillatory movement of magnet 30) may be several orders of magnitude greater (e.g. in terms of RMS amplitude) than the time-varying magnetic field to which magnet 30 synchronously responds. This single-domain (or dominant-domain) characteristic may be exploited for the purpose of low frequency synchronous electromagnetic coupling at a distance and can yield significant efficiency gains/power transfer amplification, as described in more detail below.

In exemplary inductive power transfer system 28 of FIG. 4, the power transfer efficiency enhancement/amplification between transmitter coil 32 and receiver coil 34 occurs because the time-varying magnetic field generated by transmitter coil 32 causes magnet 30 to rotate/oscillate. Rotating/oscillating magnet 30 greatly increases the magnitude of the time-varying magnetic field in the vicinity of receiver coil 34 and thus causes a correspondingly larger induced current $i_2$ to flow in receiver coil 34. Simultaneously, the time-varying magnetic field of rotating/oscillating magnet 30 interacts with transmitter coil 32 to produce a "back e.m.f." that draws additional power from the current $i_1$ in transmitter coil 32, thus ensuring conservation of energy.

Receiver 36 comprises magnet 30 which is supported for rotation or oscillation about a rotation/oscillation axis 38 and a receiver coil 34. In more general embodiments, a receiver may comprise a permanent magnet and a conduction wherein the permanent magnet is supported and the conductor (e.g. a coil) is located to facilitate movement of the magnet relative to the conductor such that the magnet's motion induces current in the conductor. In some embodiments, it is desirable that the magnet be able to move relative to the conductor in a periodically repetitive manner and also that the magnet's motion causes a periodically repetitive change of the magnetic flux in a vicinity of the conductor.

Different techniques can be used to support the magnet for movement relative to the coil. There are two basic types of such techniques: those for which the magnet's center of mass is moving relative to the coil and those for which the magnet's center of mass is stationary relative to the coil.

If the magnet's center of mass is moving, for example through the use of a linearly oscillating magnet as illustrated in FIG. 1, the displacement of the magnet's center of mass generally causes an opposing oscillatory force (Newton's third law) that couples mechanical energy into the surroundings, yielding an inefficient resonator subject to losses which are difficult to minimize. Consequently, such systems tend to have relatively low Q values (where Q, the quality factor, is the well known measure of an oscillating system's susceptibility to losses). To achieve efficient power transfer a relatively high Q (i.e. greater, and preferably much greater, than at least 10) is desired.

The alternate technique, in which the magnet's center of mass is stationary, is accordingly the currently preferred technique for mounting the magnet. This technique facilitates coupling of mechanical energy into the surroundings (Newton's third law) in the form of a torque, but it is easier to reduce losses in comparison to a system having a moving center of mass. There are two sub-types of techniques for which the center of mass is stationary: torsional (i.e. twisting) oscillation and rotational oscillation.

Figure 5:
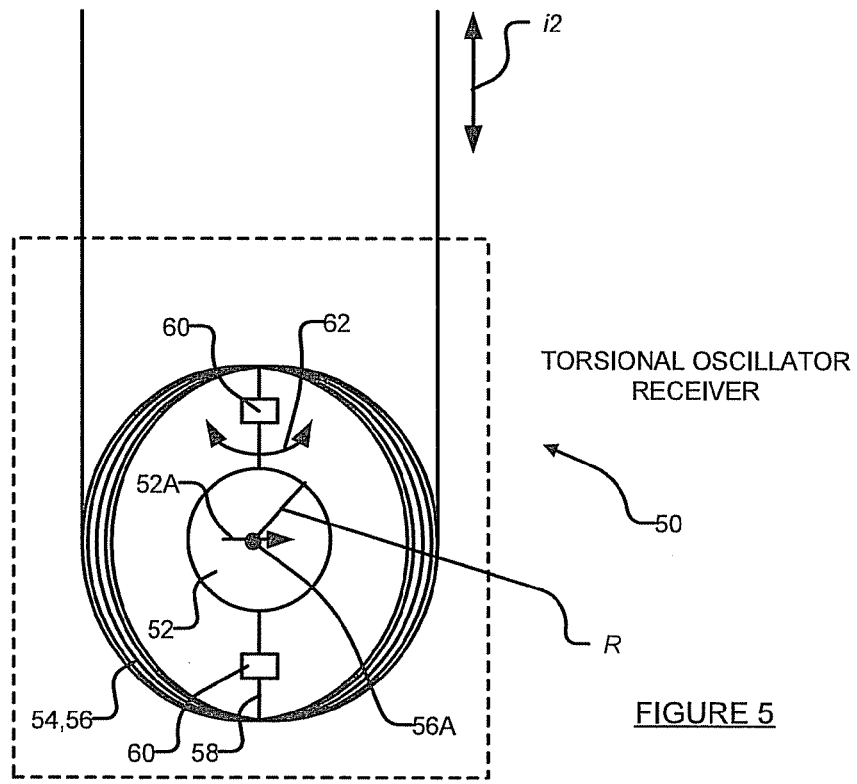
FIG. 5 schematically depicts an inductive power receiver incorporating a torsionally oscillatory permanent magnet according to a particular embodiment of the invention.

FIG. 5 depicts an inductive power transfer receiver 50 according to a particular embodiment of the invention. Receiver 50 may be located in the time-varying magnetic field produced by a corresponding transmitter (not shown). Although a number of transmitter embodiments are described in detail below, the time-varying magnetic field in which receiver 50 may be used may be generated by any suitable technique. In currently preferred embodiments, the time-varying magnetic field produced by the transmitter is periodic, although this period may change in time. Like receiver 36 (FIG. 4), receiver 50 comprises a permanent dipole magnet 52 having a dipole vector 52A oriented in the plane of the page and a conductor 54. In the illustrated embodiment, conductor 54 comprises one or more coils 56, each coil 56 comprising one or more conductive turns (not explicitly enumerated) and each coil having a coil axis 56A. In the illustrated view, coil axis 56A extends into and out of the page.

In receiver 50, magnet 52 is supported for torsional oscillation about an oscillation axis 58 in response to the time-varying magnetic field produced by the transmitter. This oscillation about oscillation axis 58 is shown by double-headed arrow 62. In the illustrated embodiment, oscillation axis 58 is in the plane of the page but is generally orthogonal (e.g. 90°±20° in some embodiments or 90°±10° in other embodiments) to dipole vector 52A of magnet 52. Magnet 52 is mounted using elastomeric or otherwise flexible mounts (e.g. bias elements) 60 which permit magnet to twist and which impart (to magnet 52) restorative torque which is related to (e.g. approximately proportional to) an amount of twist. Flexible mounts 60 may be fabricated (predominantly) from materials which are non-electrically conductive and which have relatively low permeability such as is the case with non-ferromagnetic materials. Torsional oscillators (such as that provided by magnet 52 and mounts 60) have a resonant frequency which can be estimated and tuned to a desired value. For example, in many applications, such as those involving power harvesting from existing electrical systems, 60 Hz may be the preferred frequency of operation. Receivers comprising torsional oscillators may be designed to provide other resonant frequencies. In some embodiments, such resonant frequencies are less than 500 Hz. In other embodiments, these resonant frequencies are less than 200 Hz.

Magnet 52 may be mounted via flexible mounts 60 to coil 56 as is shown in the exemplary embodiment of FIG. 5. This is not necessary. In some embodiments, magnet 52 and coil(s) 56 may be independently mounted to one or more frame components of receiver 50. In the illustrated embodiment, flexible mounts 60 are coupled to magnet 52 on or in a vicinity of oscillation axis 58. This is not necessary. In some embodiments, flexible mounts 60 may be coupled to other sides or regions of magnet 52. In one particular embodiment, flexible mounts 60 may be coupled to magnet 52 on or in a vicinity of regions that are generally orthogonal to oscillation axis 58. In the illustrated embodiment, magnet 52 comprises a permanent magnet (e.g. a neodymium magnet or a permanent magnet comprising some other magnetic material) having a generally spherical shape wherein oscillation axis 58 bisects a center of the sphere. This shape is not necessary. In other embodiments, magnet 52 may have other shapes. Magnet 52 may be symmetric about oscillation axis 58. For example, magnet 52 may have a generally cylindrical shape where the cylindrical axis is generally co-axial with oscillation axis 58. Such cylindrically shaped magnets 52 may have circular cross-sections or may have other cross-sections.

Figure 6:
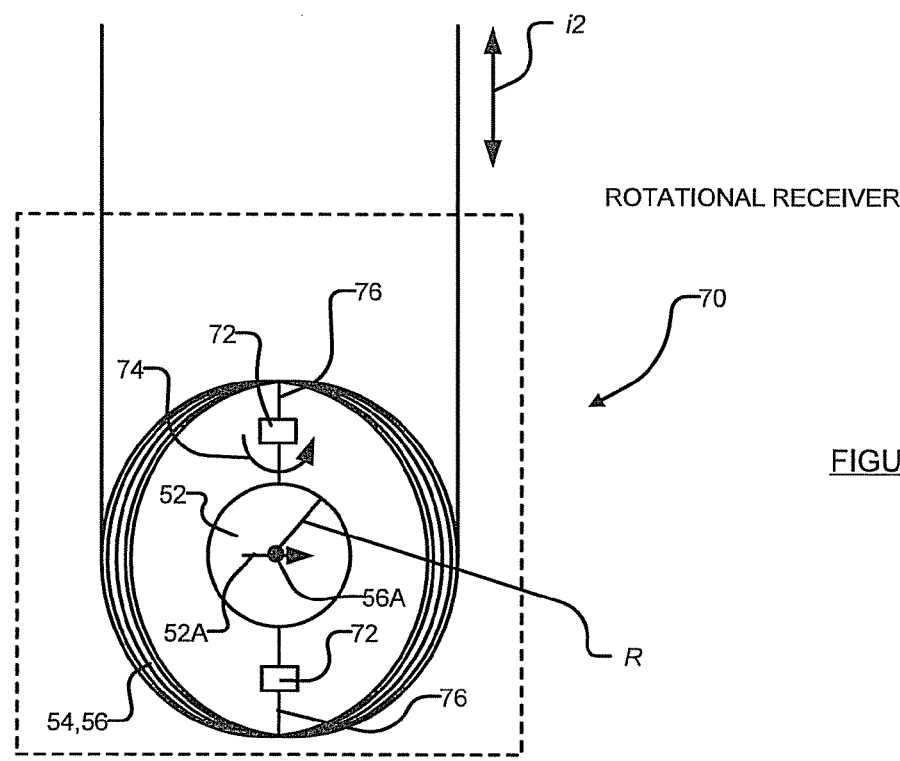
FIG. 6 schematically depicts an inductive power receiver incorporating a rotationally movable permanent magnet according to a particular embodiment of the invention.
Figure 10:
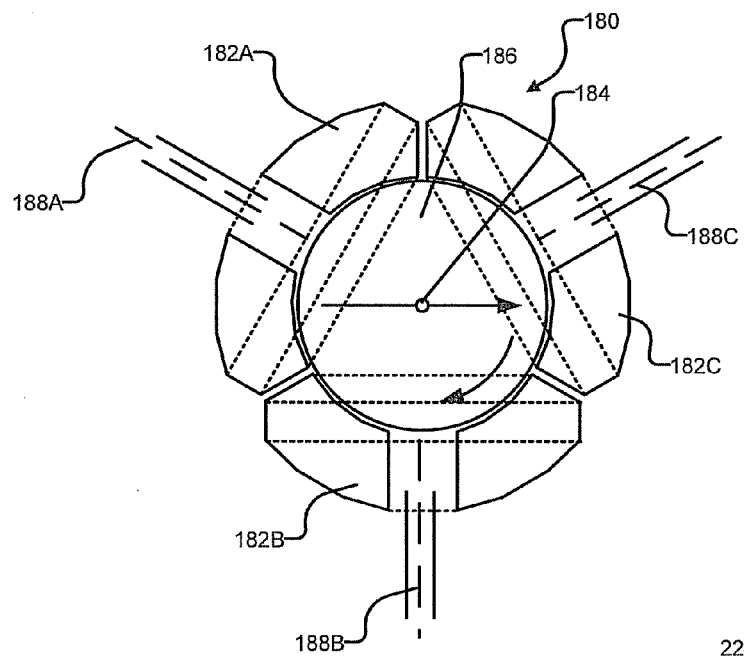
FIG. 10 schematically depicts a 3-phase power transfer system.

FIG. 6 depicts an inductive power transfer receiver 70 according to another embodiment of the invention. In many respects, receiver 70 is similar to receiver 50 (FIG. 5); Receiver 70 differs from receiver 50 in that magnet 52 in receiver 70 is mounted for rotational movement about a rotation axis 76 in response to the time-varying magnetic field produced by the transmitter. This rotational movement about rotation axis 76 is shown by single-headed arrow 74. In the illustrated embodiment, rotation axis 76 is in the plane of the page but is generally orthogonal (e.g. 90°±20° in some embodiments or 90°±10° in other embodiments) to dipole vector 52A of magnet 52. Magnet 52 may be mounted using rotational couplers 72 to permit rotation about rotation axis 76. Rotational couplers 72 may comprise rotational bearings (e.g. jewel bearings or ceramic ball bearings) which preferably have relatively low friction. Rotational couplers 72 may be fabricated (predominantly) from materials which are non-electrically conductive and which have relatively low permeability such as is the case with non-ferromagnetic materials. Receiver 70 does not resonate—the rotational frequency of magnet 52 can vary over a wide range, which may be advantageous. In some embodiments, the rotational frequencies of magnet 52 are less than 500 Hz. In other embodiments, these frequencies are less than 200 Hz. The rotationally mounted magnet receiver 70 may be preferable to the torsionally oscillating magnet of receiver 50, since it may be easier to reduce loss of mechanical energy due to coupling to the surroundings (Newton's third law) if the rotating magnet is properly balanced about its rotational axis 76.

Magnet 52 may be mounted via rotational couplers 72 to coil 56 as is shown in the exemplary embodiment of FIG. 6. This is not necessary. In some embodiments, magnet 52 and coil(s) 56 may be independently mounted to one or more frame components of receiver 70. In the illustrated embodiment, rotational couplers 72 are coupled to magnet 52 on or in a vicinity of rotation axis 76. This is not necessary. In some embodiments, rotational couplers 72 may be coupled to other sides or regions of magnet 52. In the illustrated embodiment, magnet 52 comprises a permanent magnet (e.g. a neodymium magnet) having a generally spherical shape wherein rotational axis 76 bisects a center of the sphere. This shape is not necessary. In other embodiments, magnet 52 may have other shapes. Magnet 52 may be symmetric about rotation axis 76. For example, magnet 52 may have a generally cylindrical shape where the cylindrical axis is generally co-axial with rotational axis 76. Such cylindrically shaped magnets 52 may have circular cross-sections or may have other cross-sections.

In other respects, receiver 70 may be similar to receiver 50.

In both the torsional oscillator of receiver 50 and the rotational oscillator of receiver 70, axis of oscillation/rotation 58,76 is generally orthogonal (e.g. 90°±20° in some embodiments or 90°±10° in other embodiments) to magnetic dipole moment vector 52A of magnet 52 and axis of oscillation/rotation 58, 76 is generally orthogonal (e.g. 90°±20° in some embodiments or 90°±10° in other embodiments) to the axis 56A of coil 56. Accordingly, torsional oscillation or rotational motion causes a net oscillation of magnetic flux (associated with the magnetic field of permanent magnet 52) in a vicinity of conductor 54 (e.g. through coil 56). This time-varying flux induces an AC current $i_2$ to flow through coil 56.

Maximizing the energy transfer efficiency of receiver 50 or 70 involves minimizing energy losses. To minimize mechanical energy loss, it is desirable for the system (receiver 50 or 70) to have an effective Q of at least, and preferably much greater than 10. The effective Q for torsional oscillating receiver 50 may have its conventional definition $$Q \propto \frac{\text{Energy stored in flexible couplers}}{\text{Energy dissipated per cycle}}.$$

The effective Q for rotating receiver 50 may be defined to be the inverse of the fraction of the rotational kinetic energy lost to friction per rotation—i.e.

$$E \propto \frac{\text{Total Kinetic Energy per rotation}}{\text{Energy lost to friction per rotation}}.$$

Very high effective Q values (e.g. greater than 1000 in some embodiments) for rotational receiver 70 can be obtained with readily available bearings.

Receivers 50, 70 can function as a receiver in an inductive power transfer system. As discussed above, such a power transfer system also requires a transmitter to generate a time-varying magnetic field and to thereby induce the motion of the receiver's magnet 52 or, more specifically, to cause the receiver's magnet 52 to gain mechanical energy to replace the energy being drawn by the transmitter.

The transmitter can employ any method that creates a time-varying magnetic field which extends to a vicinity of receiver 50,70. In currently preferred embodiments, the time-varying magnetic field created the transmitter is repetitive. For example, the time-varying magnetic field created the transmitter may be periodic (although the period may vary over time). In one example embodiment, the transmitter may comprise a special-purpose coil through which an alternating current flows and thereby generates a time-varying magnetic field. In another embodiment, the transmitter could comprise a conductor through which an alternating current is already flowing for some other purpose (for example, the conductor may form part of a building's electrical distribution system). In another example embodiment, the transmitter could comprise another permanent "transmitter" magnet which is caused to move and which thereby creates a time-varying magnetic field which extends to a vicinity of receiver 50, 70. Such a transmitter magnet may be driven, by way of non-limiting example, by an electric motor which converts electrical energy into mechanical energy of the transmitter magnet via a mechanical linkage or by an alternating current flowing through another "transmitter" coil which converts electrical energy into mechanical energy of the transmitter magnet via electromagnetic interaction (e.g. Lorentz force). In general, the transmitter can employ any mechanical means of moving the transmitter magnet.

FIG. 7A schematically depicts a transmitter 100 according to one particular embodiment suitable for use with any of the receivers described herein. Transmitter 100 comprises a motor 102 which is coupled via its drive shaft (not explicitly enumerated) and via linkage 104 to transmitter magnet 106 so as to enable motor 102 to move transmitter magnet 106. By way of non-limiting example, motor 102 may comprise an electric motor (e.g. an AC induction motor, a DC brush motor, a DC brushless motor or the like). Motor 102 may be driven by a suitable electric signal from a suitable driver circuit (not shown). Such driver signals and circuits are well known to those skilled in the art. Linkage 104 may comprise any suitable mechanical linkage which transfers mechanical energy from the shaft of motor 102 to magnet 106. By way of non-limiting example, linkage 104 may include one or more pulleys, gears, clutches or the like. Linkage may be designed to permit motor 102 to operate in its optimum range (e.g. optimum efficiency range) while imparting desirable motion characteristics on transmitter magnet 106.

Transmitter magnet 106 may have characteristics similar to those of the receiver magnets (e.g. magnets 30, 52) described herein. Transmitter magnet 106 may comprise a permanent dipole magnet which may comprise neodymium, ferrite or the like. In the illustrated embodiment of FIG. 7A, transmitter magnet 106 has a generally cylindrical shape having a cylindrical axis 108 and has a dipole vector 106A which is oriented from left to right in a plane which extends into an out of the page. Motor 102, linkage 104 and magnet 106 may be configured to rotate magnet 106 about a rotation axis 110 which may be co-axial with cylindrical axis 108. Such rotational movement may be periodic; however, the period of rotation may change. Magnet 106 may be supported for rotation by suitable rotational couplers (not shown). Such rotational couplers may be similar to rotational couplers 72 of receiver 70 described above.

The cylindrical shape of transmitter magnet 106 is not limited to a cylinder with a circular cross-section and transmitter magnet 106 may have a variety of cross-sectional shapes. In other embodiments, transmitter magnet 106 may have other shapes. For example, transmitter magnet 106 may be generally spherically shaped such that rotation axis 110 is generally co-axial with a diameter of the sphere. In other embodiments, motor 102, linkage 104 and magnet 106 may be configured to oscillate magnet 106 about axis 108 (e.g. to pivot magnet 106 about axis 108 by a portion of a rotation in a first angular direction and then to pivot magnet 106 back to its original position in an opposing angular direction). Such oscillatory movement may be periodic; however, the period of oscillation may change. Transmitter magnet 106 may be suitable supported for such oscillatory motion—e.g. by or more suitable rotational couplers similar to rotational couplers 72 of receiver 70 or by one or more suitable flexible couplers similar to flexible mounts 60 of receiver 50 described above. Transmitter 100 may impart oscillatory motion on magnet 106 by driving magnet 106 in opposing angular directions or by intermittently driving magnet 106 in one angular direction and allowing restorative torque imparted by flexible mounts to return magnet 106 in the opposing angular direction.

FIG. 7B schematically depicts a transmitter 120 according to another particular embodiment suitable for use with any of the receivers described herein. Transmitter 120 is similar in many respects to transmitter 100; consequently, similar reference numerals are used to indicate similar features in transmitter 100 and transmitter 120. Transmitter 120 differs from transmitter 100 in that rather than being mechanically driven, transmitter magnet 106 is driven by electromagnetic interaction between magnet 106 and time-varying current in one or more coils 122. In the illustrated embodiment, transmitter 120 comprises a pair of coils 122 which are positioned and oriented to have substantially co-axial coil axes 122A in the plane of the page. Each of coils 122 may comprise one or more turns. A time-varying electric current may be applied to coils 122.

The interaction of the magnetic field of transmitter magnet 106 and the time-varying electric current in coils 122 causes a time-varying Lorentz force and a corresponding time-varying torque which tends to move transmitter magnet 106. The current in coils 122 may be driven by one or more suitable electric signals from one or more suitable driver circuits (not shown). Such driver signals and circuits are well known to those skilled in the art. There are many different possible coil configurations and associated drive currents all of which should have the characteristic that they carry out positive mechanical work on transmitter magnet 106. Positive mechanical work implies that the time average of the torque caused by the magnetic field of coils 122 on transmitter magnet 106 multiplied by the angular velocity of rotation of transmitter magnet 106 should be greater than zero and preferably as large as possible for any given r.m.s. current.

Coils 122 (and the drive circuits imparting current therein) and magnet 106 may be configured to rotate magnet 106 about a rotation axis 110 which, in the illustrated embodiment, is co-axial with cylindrical axis 108 of cylindrically shaped magnet 106. Such rotational movement may be periodic; however, the period of rotation may change. In other embodiments, coils 122 (and the drive circuits imparting current therein) and magnet 106 may be configured to oscillate magnet 106 about axis 108. Such oscillatory movement may be periodic; however, the period of oscillation may change. Transmitter magnet 106 of transmitter 120 may be suitable supported for rotational and/or oscillatory motion in a manner similar to transmitter magnet of transmitter 100 described above.

In other respects, transmitter 120 may be similar to transmitter 100.

Figure 13:
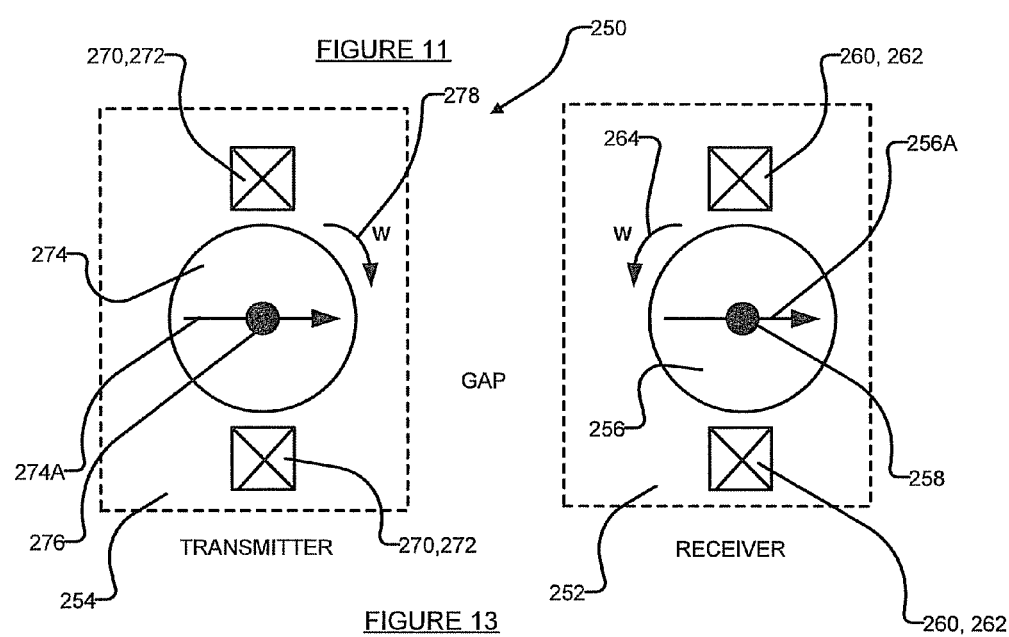
FIG. 13 schematically depicts a cross-sectional view of power transfer system according to a currently preferred embodiment.

FIG. 13 schematically depicts a cross-sectional view of power transfer system 250 according to a currently preferred embodiment. Power transfer system 250 comprises a receiver 252 and a transmitter 254. Receiver 252 comprises a permanent magnet 256 supported for rotational motion and is substantially similar to rotational receiver 70 (FIG. 6) described above. More particularly, receiver 252 comprises a conductor 260, which in the illustrated embodiment, comprises a coil 262 having one or more conductive turns. Coil 262 is shown in cross-section and has a coil axis (not explicitly enumerated) which extends from left to right in the plane of the page. In other embodiments, receiver 252 may comprises one or more additional coils 262. Receiver magnet 256 comprises a permanent dipole magnet (e.g. of neodymium, ferrite or the like) which has a dipole vector 256A. Receiver magnet 256 of the illustrated embodiment is cylindrically shaped with a cylinder axis 258. In other embodiments, receiver magnet 256 may be spherically shaped in which case it may have a diameter 258. Receiver magnet 256 is supported for rotational motion by rotational couplers (not shown) similar to rotational couplers 72 of receiver 70. The rotational motion of receiver magnet 256 may be about cylinder axis 258 as shown by arrow 264.

Transmitter 254 is a coil-driven transmitter similar to transmitter 120 (FIG. 7B) described above. Transmitter 254 comprises a permanent magnet 274 supported for rotational motion. Transmitter 254 comprises a conductor 270, which in the illustrated embodiment, comprises a coil 272 having one or more conductive turns. Coil 272 is shown in cross-section and has a coil axis (not explicitly enumerated) which extends from left to right in the plane of the page. In other embodiments, transmitter 254 may comprises one or more additional coils 272. Transmitter magnet 274 comprises a permanent dipole magnet (e.g. of neodymium, ferrite or the like) which has a dipole vector 274A. Transmitter magnet 274 of the illustrated embodiment is cylindrically shaped with a cylinder axis 276. In other embodiments, transmitter magnet 274 may be spherically shaped in which case it may have a diameter 276. Transmitter magnet 274 is supported for rotational motion by rotational couplers (not shown) similar to rotational couplers 72 of receiver 70 (FIG. 6). The rotational motion of transmitter magnet 274 may be about cylinder axis 276 as shown by arrow 278. It may be noticed that the rotational motion of transmitter magnet 274 and receiver magnet 256 are in opposite angular directions.

In operation, transmitter 254 and receiver 252 are brought into relative proximity to one another and may be aligned with one another. In some embodiments, rotation axis 258 of receiver 252 and rotation axis 276 of transmitter 254 are substantially (e.g. ±20° in some embodiments or ±10° in other embodiments) parallel. In other embodiments, rotation axis 258 of receiver 252 and rotation axis 276 of transmitter 254 are substantially (e.g. ±20° in some embodiments or ±10° in other embodiments) co-axial. Current is then supplied to transmitter coil 272 by a suitable driving circuit (not shown). This current causes transmitter magnet 274 to rotate about rotational axis 276 in direction 278 which creates a first time varying magnetic field. Transmitter magnet 274 may be caused to rotate periodically, which causes a corresponding periodic variation in the first time varying magnetic field. The first time varying magnetic field is experienced by receiver 252 which is separated from transmitter 254 by a gap. The first time varying magnetic field may create a corresponding first magnetic flux in coil 262 which may induce a small amount of current in receiver coil 262. However, the first time varying magnetic field also exerts a torque on receiver magnet 256 which tends to cause receiver magnet 256 to rotate about is axis 258 in direction 264. The rotation of receiver magnet 256 creates a second time varying magnetic field which creates a corresponding second magnetic flux in receiver coil 262 and induces a corresponding current in receiver coil 262. Receiver coil 262 may be electrically connected to a suitable load (e.g. a battery or some other load) and may deliver current to that load.

The second magnetic flux at receiver coil 262 (i.e. the flux created by the rotation of receiver magnet 256) may be significantly greater than the first magnetic flux at receiver coil 262 (i.e. the flux created by the first time varying magnetic field output by transmitter 254). In some embodiments, a ratio of a RMS flux through receiver coil 262 created by the second time-varying magnetic field to a RMS flux through receiver coil 262 created by the first magnetic field is greater than or equal to 10. In some embodiments, this ratio is greater than or equal to 100. In other embodiments, this ratio is greater than or equal to $10^3$. In still other embodiments, this ratio is greater than or equal to $10^4$.

Power transfer system 250 has been successfully used to charge the battery of an electric vehicle connected to receiver coil 262 in a kilowatt scale system. Power transfer system 250 has also been used to power a significantly smaller battery connected to receiver coil 262 in a system having a power output on the order of 60 watts. In some embodiments, FIG. 8A schematically depicts an inductive power transfer system 150 comprising a transmitter 152 and a receiver 154 according to a particular embodiment. Transmitter 152 may be similar to transmitter 100 or 120 described above. Receiver 154 may be similar to receiver 50 or 70 described above. Transmitter 152 and receiver 154 are separated by a gap 156. Gap 156 illustrated in FIG. 8A may be filled with air or may be a vacuum. In some embodiments, the dimension d of gap is at least 10% of the minimum cross sectional width of receiver 154. In some embodiments, the dimension d of gap 156 may be greater than or equal to 5 cm. In some embodiments, the dimension d of gap 156 may be greater than or equal to 10 cm. In other embodiments, the dimension d of gap 156 may be greater than or equal to 15 cm.

We may define a "maximum radius of motion" of the receiver magnet (e.g. magnet 52 of receivers 50, 70) about its axis of rotation/oscillation (e.g. axis 58 of receiver 50 or axis 76 of receiver 70). For torsional oscillatory and/or rotational motion, this maximum radius of motion of the receiver magnet in receiver 154 may comprise a distance between the axis of oscillation/rotation and an outermost point on the receiver magnet that rotates/oscillates about the axis of oscillation/rotation under the influence of a magnetic field created by transmitter 152. This maximum radius of motion is labeled R in receiver 50 (FIG. 5) and receiver 70 (FIG. 6). In some embodiments, a ratio of the dimension d of gap 156 to the maximum radius of motion R of the receiver magnet is greater than or equal to 1. In some embodiments, this ratio is greater than or equal to 5. In other embodiments, this ratio is greater than or equal to 10. In still other embodiments, this ratio is greater than or equal to 20.

FIG. 8B illustrates the same inductive power transfer system 150 as FIG. 8A which comprises transmitter 152 and receiver 154. In the FIG. 8B illustration, however, a physical obstruction 158 is located in gap 156. FIG. 8B shows how power can be inductively transferred from transmitter 152 to receiver 154. Obstruction 158 may comprise a gas, liquid or solid. Obstruction 158 may comprise physically impenetrable non-magnetic barrier (such as the wall of a stainless steel pressure chamber). For most efficient operation, gap 156 should be, free of (or have a limited amount of) high permeability material(s) and/or electrically conductive material(s). High permeability materials located in gap 156 can shield magnetic field generated by transmitter 152 from effectively reaching the receiver magnet of receiver 154. Electrically conductive materials located in gap 156 can generate so-called eddy currents which can contribute resistive losses and which can generate magnetic fields that tend to counter the magnetic fields desired for the operation of power transfer system 150. The efficiency losses attributable to eddy currents may be referred to as eddy current damping.

FIGS. 9A and 9B respectively depict side and front elevation views of a receiver 170 comprising a coil 172 and receiver magnet 174. To achieve high efficiency in receiver 170, it is desirable to position coil 172 as close a possible to receiver magnet 174 while permitting magnet to move (e.g. to oscillate or rotate as described above). This is shown in FIGS. 9A and 9B, where receiver 170 comprises a single coil 172 having one or more conductive turns and coil 172 is separated from receiver magnet 174 by a space 176 which is kept as small as possible.

In some circumstances, power transfer efficiency of a receiver can be increased by using multiple coils to surround the magnet. For example, FIG. 9 shows a receiver 180 according to a particular embodiment wherein receiver 180 comprises three coils 182A, 182B, 182C. In the illustrated embodiment, each of coils 182A, 182B, 182C is oriented at an offset of 120°, around rotation/oscillation axis 184 of receiver magnet 186. Each of coils 182A, 182B, 182C has a corresponding coil axis 188A, 188B, 188C and each coil axis 188A, 188B, 188C is substantially orthogonal (e.g. 90°±20° in some embodiments or 90°±10° in other embodiments) to rotation/oscillation axis 184. Coils 182A, 182B, 182C may be designed to be substantially similar to one another in terms of their induction characteristics such that when receiver magnet 186 rotates/oscillates at a constant speed, a substantially similar current is induced in each of coils 182A, 182B, 182C, but the current in each coil 182A, 182B, 182C is offset from that of its neighbors by 120°. Depending on the application, each phase of current induced in receiver 180 could be used separately, or the three phases could converted to a single AC phase or to direct current (DC) using standard electrical conversion techniques.

The choice of coil design may be influenced by physical dimensions and space constraints (for example, if a flatter device is required, a single coil may be preferable over a multiple coil implementation). Irrespective of coil design, it is desirable to maximize the amount of conductor in the coil near the magnet, where the magnetic field is strongest, while minimizing the amount of conductor in regions where the magnitude of the magnetic field is too low to substantially increase the induced power without excessively increasing the corresponding resistance of the coil. In general, it is desirable to maximize the ratio of the square of induced voltage in the coil to the coil resistance and thus maximize the power output of the coil. For this reason, for any given magnet, there exists an optimal size and shape of coil.

Each coil used in a receiver comprises one or more conductive turns. Consider a single coil comprising a number of turns. When the receiver magnet rotates with an angular frequency ω, it is reasonable to assume that the magnetic flux through the coil located near the receiver magnet will oscillate at a similar frequency. Without wishing to be bound by theory, the inventor(s) are of the view that the efficiency of inducing electrical power from the movement of the permanent receiver magnet is related to the term $\Phi_0^2/R_C$, where $\Phi_0^2$ is the amplitude of the periodic flux through the coil and $R_C$ is the coil resistance. Since both factors in the term $\Phi_0^2/R_C$ are related to the receiver coil and its windings, this term may be referred to as the winding factor. In general, the efficiency of inducing electrical power from the movement of the permanent receiver magnet increases as the winding factor increases. In other words, relatively high efficiency can be achieved by increasing the magnetic flux while reducing the resistance of the winding. However, this is not always an easy objective to achieve because the addition of each conductive turn adds both flux and resistance. It is therefore optimal to add an additional conductive turn to the receiver, provided that the benefit of the additional flux contribution from the new turn outweighs its resistance.

Figure 11:
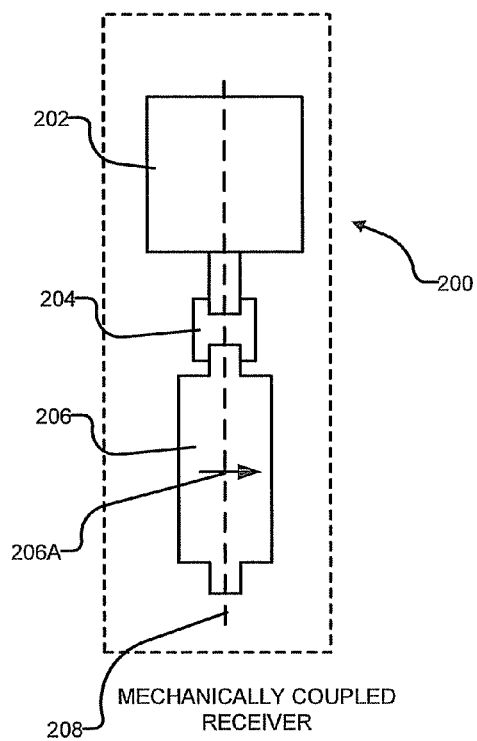
FIG. 11 shows a receiver according to another wherein the receiver magnet is mechanically coupled to a generator.

FIG. 11 shows a receiver 200 according to another embodiment wherein receiver magnet 206 is mechanically coupled via linkage 204 to a secondary power transduction device (e.g. a generator, a pump or the like) 202 to provide another method of drawing power from motion of receiver magnet 206. In the FIG. 11 example, receiver magnet 206 is a cylindrically shaped permanent magnet having a dipole vector 206A and supported for rotation about rotational axis 208. With the embodiment of receiver 200, power transduction device 202 may generally comprise any device which can use the mechanical energy associated with rotating receiver magnet 206 and can convert this energy into another desired form.

Continuous power transfer may be desirable in some applications, such that the transmitter and receiver remain in operation at all times. In other applications manual operation of the system may be desirable.

For steady state operation, it is desirable in some cases that the motion of the receiver magnet be synchronous with the externally applied time-varying magnetic field to which the receiver magnet is responding (e.g. the time varying magnetic field produced by a transmitter). Where this externally applied time varying magnetic field is periodic, this synchronicity is achieved when the receiver magnet rotates, oscillates or otherwise moves with the same period as the magnetic field to which it responds.

In some applications, it may be desirable to control the power transfer using one or more detection systems and/or start-up systems. A detection system can be used in a transmitter to detect the presence of a suitable receiver and vice versa. A start-up system can be used to help ensure that the movement of the receiver magnet is synchronous with the externally applied time varying magnetic field. Detection and startup systems that are suitable for use with a torsional oscillator will likely be unsuitable for use with a rotational oscillator, and vice versa.

Starting up a receiver having a torsional oscillator may be accomplished by generating a magnetic field with a suitable frequency that is tuned to the resonant frequency of the oscillator or tuning the resonant frequency of the oscillator to match an applied magnetic field. In the case of a torsional oscillator (e.g. receiver 50 of FIG. 5), when an externally applied oscillatory magnetic field has a component parallel to the axis 56A of coil 56, receiver magnet 52 is subjected to a resultant oscillatory torque. If the frequency of the applied field is sufficiently close to the resonant frequency of the torsional resonator, rotational oscillations will build up in receiver magnet 52 and will in turn drive an enhanced level of induced voltage in coil 56. This enhancement is due to both the Q of the resonator of receiver 50 and the high field strength associated with receiver magnet 52. Accordingly, a transmitter operating at the desired frequency can induce the motion of torsional oscillator receiver 50 and therefore "turn on" or otherwise start-up receiver 50.

In contrast, a different technique may be desired to "turn on" or otherwise start up a rotationally oscillating receiver (e.g. receiver 70 of FIG. 6) from a stationary state. One startup approach is for the transmitter to smoothly and gradually increase the frequency of its transmitted magnetic field until the desired frequency is reached. In the case of a transmitter with a rotating transmitter magnet (e.g. magnet 106 of transmitter 100 (FIG. 7A) of transmitter 120 (FIG. 7B)), this may be achieved by commencing rotation of transmitter magnet 106 from a stationary state and smoothly and gradually increasing the frequency of the rotation until a desired frequency is reached. Another approach is for the transmitter to transmit the magnetic field at the intended operating frequency and for a controller then to apply a control current to the receiver coil(s) to cause the receiver magnet to undergo rotational acceleration until its rate of rotation matches and "locks in" to that of the externally applied magnetic field, at which point normal (e.g. synchronous) power transfer operation can commence. For example, in the case of rotational receiver 70 of FIG. 6, suitable sensors (not shown) may be used to detect a frequency of an externally applied magnetic field and a controller (not shown) can drive a control current in coil 56, such that the field created by the control current in coil 56 causes receiver magnet 52 to accelerate to the desired operational frequency of the externally applied magnetic field.

In either case of torsional oscillation or rotation, the detection of the presence, proximity and approximate orientation of nearby transmitter magnets and receiver magnets can be achieved with well known electronic components such as solid state magnetic field sensors based on the Hall Effect. Proximity and magnet orientation information derived from such sensors can be used to initiate the power transfer operation. Additionally or alternatively, radio frequency identification (RFID) technology or other RF communication techniques can be used to communicate proximity and/or magnet orientation information for use in initiating the power transfer operation.

In the case of Hall effect sensors, well known techniques can be used to isolate the signal produced by a particular magnet (e.g. to isolate a receiver magnet from a transmitter magnet or vice versa) and thus determine the proximity of the particular magnet. A proximity detecting Hall effect sensor system can be provided in the transmitter, receiver, or both, and will operate equally well through an air or non-magnetic physically impenetrable barrier, whereas RFID sensors operate less effectively through metal barriers.

Figure 12:
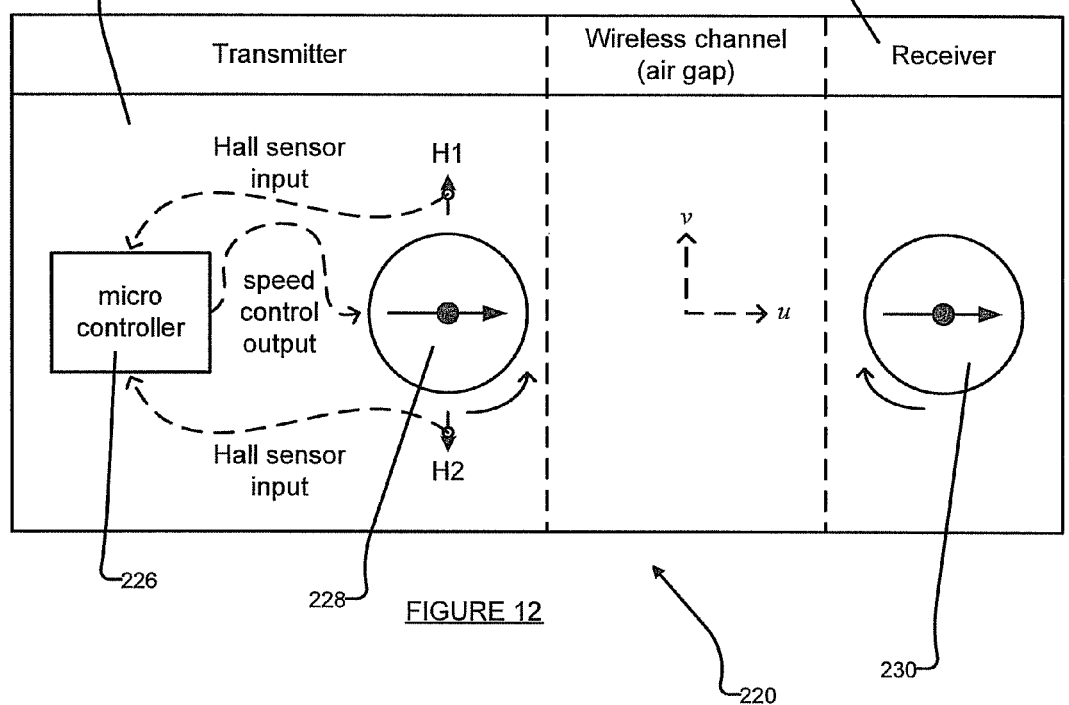
FIG. 12 shows the use of Hall Effect sensors in a transmitter to determine various types of operational information.

FIG. 12 shows an inductive power transfer system 220 comprising a transmitter 222 and a receiver 224 separated by a gap. System 220 incorporates a pair of Hall Effect sensors (H1, H2) in transmitter 22 which are used to provide information to a controller 226 about various operation characteristics of system 220. In the illustrated embodiment, transmitter magnet 228 and receiver magnet 230 are rotationally mounted with axes of rotation into and out of the page and sensors H1, H2 are mounted on either side of transmitter magnet 228 with their directional sensitivities (to magnetic fields) indicated by arrows. As is well known, the signal from sensors H1, H2 is related to the magnetic field experienced by the sensors in the outward radial directions. With this configuration, it may be observed that the sum of the sensor signals (H1+H2) is relatively insensitive to rotation of transmitter magnet 228; however, when receiver magnet 230 is present, it produces a significant change in the sum of the sensor signals (H1+H2). Accordingly, the sum of the sensor signals (H1+H2) can be used by controller 226 to determine a presence and/or proximity of receiver 224.

This type of proximity sensing may be characterized as sensing an intensity of the magnetic field created by receiver magnet 230. If the intensity is below a threshold, then controller 226 may emit a signal that causes transmitter 222 to shut down (e.g. to discontinue driving transmitter magnet 228). If the intensity is above a threshold, then controller 226 may emit a signal that causes transmitter 222 to start up (e.g. to start motion of transmitter magnet 228). A similar intensity sensing system may be implemented in receiver 224 to sense an intensity of the magnetic field created by transmitter magnet 228. A controller in the receiver may emit signals if the intensity is above or below corresponding thresholds. The emitted signals may provide information to a user (e.g. transmitter needs to be moved closer) or may be used to adjust a coupling between the receiver coil and an electrical load (e.g.

to decouple the load from the receiver if the intensity is too low or to couple the load to the receiver if the intensity is sufficiently high).

System 220 and its sensors H1, H2 in transmitter 222 may also have the ability to sense the orientation receiver magnet 230 on one axis. Adding another pair of Hall Effect sensors on an orthogonal axis may provide further refined information about the orientation of receiver magnet 230. Such information can be used by controller 226 to output suitable signals. For example, upon detection that an orientation angle of receiver magnet 230 (relative to the time varying magnetic field created by transmitter magnet 228) is greater than a threshold amount, controller 226 may output a signal indicating that the relative orientation of transmitter 222 and receiver 224 should be re-aligned to reduce this orientation angle. A similar sensing system (e.g. a controller and a number of sensors) could be provided in receiver 224 to detect similar information about the orientation angle of receiver magnet 230 (relative to the time varying magnetic field created by transmitter magnet 228) or of transmitter magnet 228 and receiver magnet 230.

In the case of a rotational oscillator receiver, it may be desirable to detect the relative phase of the transmitter field and the receiver magnet, since for maximum efficiency operation, the transmitter field and the receiver magnet should be synchronous (i.e. frequency-matched). Phase differences can be detected through a shift in the so-called "slip angle" and corrective measures can be taken before a critical phase angle difference is reached and synchronization is lost.

One slip detection method can use a radio frequency (RF) channel to communicate magnet position information determined by one or more Hall Effect sensors. Such magnet position information can be detected in either one of the receiver or transmitter and communicated to the other one of the receiver or transmitter. A transmitter or receiver in receipt of this magnet position information can use this information, together with information characterizing its own magnet's position, to calculate the slip angle.

The FIG. 12 system 220 can be used to detect the slip angle. The orientation of sensors H1, H2 makes the sum of the sensors' output signals (H1+H2) insensitive to the angle of transmitter magnet 228, but sensitive to the angle of receiver magnet 230. The difference of the sensors signals (H1−H2) primarily provides phase information for transmitter magnet 228. Therefore the phase difference between transmitter magnet 228 and receiver magnet 230 is related to the phase difference between (H1+H2) and (H1−H2). With this slip angle information, controller 226 can control the speed of transmitter magnet 228. For example, if the slip angle approaches too close to 90°, controller 226 could reduce the drive signal associated with driving transmitter magnet 228, thereby slowing down transmitter magnet 228 and causing a corresponding reduction in slip angle. Conversely, if the estimated slip angle was sufficiently small, controller 226 could increase the drive signal associated with driving transmitter magnet 228, which may cause the slip angle to increase, but which may allow greater power transfer. A control objective may be to maximize power transfer without losing synchronization. The FIG. 12 slip angle control technique can operate through a metallic barrier, whereas the aforementioned RF method cannot.

Suitable sensors and corresponding detection system can also be used to monitor current, voltage, frequency and torque and the monitored values of such parameters can be applied to control and adapt power transfer for specific applications. This control capability can be provided in the transmitter, receiver, or both. A communication link can be provided between the transmitter and the receiver, but this will not always be necessary nor will it be beneficial in all applications. The same Hall Effect sensors and/or RF communication components can be used for both proximity detection and slip angle detection.

In still other applications it may be desirable to control the power transfer using one or more detection and charge-based "turn-off" systems. In circumstance where a charge transfer system is being used to charge a battery (i.e. the battery is connected as a load to the coils on the receiver), the system can be designed to turn off when the receiver moves away from the transmitter, or when the battery is charged. Such turn-off may be effected, for example, by opening a switch in an electrical coupling between the receiver and the battery. The receiver could comprise one or more sensors that detect information correlated with the battery's state of charge (e.g. voltage measurement or other means). Signals from such sensors could be provided to a controller which could use these signals to estimate the battery's state of charge and whether this charge was greater than a threshold, for example. The controller may then turn off the charging, for example, by opening a switch in an electrical coupling between the receiver and the battery. In some embodiments, the controller may additionally or alternatively emit a signal (e.g. to a user) indicating that the battery is charged.

Knowledge of the battery's state of charge could also be passed to the transmitter via suitable communications means (e.g. telemetry). Once the transmitter determines that the battery is charged, it can discontinue generation of the time-varying magnetic field. In other embodiments, the transmitter itself can determine the state of charge of a battery electrically connected as a load to the receiver. For example, suitable sensors at the transmitter side can be used to sense information correlated with total electrical power load of the transmitter. These signals can be provided to a controller which can estimate the total power load of the transmitter. As the battery connected to the receiver becomes fully charged, the power load at the transmitter will drop substantially, and at that time the transmitter can shut off.

The previously described power transfer systems are magnetically coupled and mechanically resonant. For example, a torsional oscillator's mechanical resonance is defined in terms of its Q value. A rotational oscillator is not a resonant system per se, but it does have the key characteristics of a resonant system, since its motion is cyclic and the fraction of energy lost per rotation is small. A rotational oscillator can accordingly be defined in terms of an "effective Q value" as previously mentioned. Such magnetically coupled and mechanically resonant power transfer systems have significant advantages over electromagnetic resonator based systems. First, they allow high Q, or high effective Q, to be obtained at low frequency, since this is possible for small mechanical resonators but not for small electromagnetic resonators. This first advantage may be useful in very low power devices through the use of AC pickup from building wiring. Second, they involve a smaller rate of change of magnetic field due to the enhancement arising from the strength of the dipole magnet. This second advantage may be useful in transdermal biomedical applications where the hazards of tissue exposure to RF fields may be of concern. As well, this approach may be useful for low power applications where it is advantageous to separate the device from the electrical wiring.

The foregoing features could be important in an application such as electric vehicle battery charging, whether human-operated or autonomous, and including vehicles traveling in outer space, the atmosphere, on land, roads or rail, both above and below ground, or on or under water. In many cases it will be advantageous not only to avoid metallic contact in such charging operations, but also to avoid the need for any kind of exterior flexible wiring or high precision vehicular alignment. For example, a vehicle could move within about 10 cm of a charging location, and charging would commence automatically if the vehicle and charging location incorporated a inductive power transfer capability as previously described. To facilitate this, the receiver, or transmitter, or both, should be capable of transferring alignment information to a guidance system incorporated in the vehicle. For example, in an electric automobile, a display on a charging station housing the transmitter could indicate to the automobile driver whether the vehicle had reached a suitable position, and indicate any directional correction required for the vehicle to reach that position. To increase the acceptable range of vehicle positions, particularly in the vertical direction, the receiver could include a means for automatically adjusting the position of the transmitter for optimal coupling. To simplify the charging operation, automatic communication between the charging station and the vehicle could facilitate automatic billing for the electrical energy that is delivered while possibly providing a range of additional useful information as well.

Another advantage of a mechanically coupled power transfer system is scalability over a wide range of size scales. For example, extremely small, biocompatible and injectable systems, using 1 mm diameter or smaller magnets, could be used to generate milliwatts of power for subcutaneous drug delivery. It is envisaged that the low frequency operation of the inductive power transfer systems described herein make such systems useful for a wide range of biomedical applications, including without limitation, charging or powering implanted devices (e.g. artificial hearts or the like). Other non-limiting applications include charging personal electronic devices and household appliances.

Various embodiments and implementations described herein make use of a controller to receive signals and to generate other signals or take other actions in response thereto. Such controllers may be implemented using various types of programmable controllers or processors. For example, such controllers may comprise a suitably programmed computer, a suitably programmed embedded digital processor, a suitably programmed logic array (e.g. FPGA) or the like. Controllers may comprise more than one such processor. Controllers may also include or otherwise have access to internal and/or external memory (not shown) which stores program information and the like. In some embodiments, controllers may be operatively connected (via suitable network interface(s) and network connection(s) to one or more remote workstation(s) and/or to other system(s). In such systems, part of the functionality of the controllers described herein may be implemented on such remote workstation(s) and/or system(s). While not expressly shown or described above, well known signal conditioning circuitry may be used to interface with such controllers. By way of non-limiting example, such signal conditioning circuitry may comprise analog to digital converters (ADCs), digital to analog converters (DACs), amplifiers, buffers, filters or the like. In some embodiments, the controllers referred to herein may be implemented by suitable control circuitry in the analog domain.

Variations and modifications of the foregoing are within the scope of the present invention. It is understood that the invention disclosed and defined herein extends to all the alternative combinations of two or more of the individual features mentioned or evident from the text and/or drawings. All of these different combinations constitute various alternative aspects of the present invention. The embodiments described herein explain the best modes known for practicing the invention. Aspects of the invention are to be construed to include alternative embodiments to the extent permitted by the prior art. This disclosure is to be interpreted as including all such modifications, permutations, additions and sub-combinations. For example:

FIG. 12 shows a number of Hall Effect sensors H1, H2 and a controller 226 in a transmitter 222 and the description above describes how these sensors and controller 226 may be used to detect the proximity of a receiver 224, the relative orientation of transmitter magnet 228 and receiver magnet 230 and the slip angle. It will be appreciated that a similar sensor system (e.g. similar sensors and a controller) could be provided in receiver 224 and that such a sensor system could be used to detect the proximity of a transmitter 222, the relative orientation of transmitter magnet 228 and receiver magnet 230 and the slip angle. Rather than adjust the speed of movement of transmitter magnet 228, a sensor system located in the received could adjust a coupling between the receiver conductor (e.g. a receiver coil (not shown in FIG. 12)). By way of non limiting example, the electrical coupling between the receiver coil and a load may comprise a switch which may be opened or closed if the slip angle varies too significantly from a desired level. It is generally desirable to adjust such a coupling in a manner which will ensure that the slip angle is in a range where positive work will be done on the load.

FIG. 13 shows an embodiment where transmitter 254 and receiver 252 are both rotational oscillators—i.e. transmitter magnet 274 and receiver magnet 256 are mounted for rotational movement about their respective rotational axes 276, 258. In other embodiments, transmitter 254 and receiver 252 may comprise torsional oscillators wherein transmitter magnet 274 and receiver magnet 256 are mounted (using flexible mounts comprising bias elements similar to flexible mounts 60 of receiver 50 (FIG. 5)) for torsional oscillatory movement about their respective oscillation axes 276, 258. Other than for the flexible mounts and the oscillatory motion, such torsional oscillator embodiments may have characteristics similar to those described above for the rotational system 250.

What is claimed is:

1. A receiver for extracting energy from a first time-varying magnetic field, the receiver comprising:
   a conductor; and
   a support and a receiver magnet moveably mounted to the support by a rotational coupling, the receiver magnet located in the first time-varying magnetic field and the receiver magnet moveable relative to the support in response to the first time-varying magnetic field;
   wherein the conductor and receiver magnet are positioned relative to one another such that movement of the receiver magnet creates a second time-varying magnetic field in a vicinity of the conductor to thereby induce current in the conductor; and
   wherein the rotational coupling is connected between the support and the receiver magnet to permit unrestricted rotational motion of the receiver magnet relative to the support about a rotation axis in response to the first time-varying magnetic field.

2. A receiver according to claim 1 wherein the conductor comprises one or more coils, each coil comprising one or more conductive turns.

3. A receiver according to claim 1 wherein the first time-varying magnetic field is periodic and the receiver magnet periodically moveable, via the rotational coupling, to move relative to the support with a period that matches a period of the first time-varying magnetic field.

4. A receiver according to claim 1 wherein the receiver magnet comprises a dipole permanent magnet.

5. A receiver according to claim 1 wherein the receiver magnet comprises a dipole permanent magnet and the receiver magnet is oriented with its magnetic dipole vector orthogonal to within ±20° to the rotation axis of the receiver magnet.

6. A receiver according to claim 1 wherein the rotational coupling comprises one or more of: ceramic ball bearings; jewel bearings; and other rotational bearings.

7. A receiver according to claim 1 comprising one or more magnetic field sensors configured for sensing a slip angle comprising a phase difference between periodic variation of the first time-varying magnetic field and corresponding periodic motion of the receiver magnet.

8. A receiver according to claim 7 comprising a controller connected to receive one or more signals from the one or more magnetic field sensors, configured to estimate the slip angle and connected to emit an output signal which adjusts an electrical coupling between the conductor and an electrical load based on the estimated slip angle to thereby maintain a slip angle for which there is positive work produced on the load.

9. A receiver according to claim 1 comprising one or more magnetic field sensors configured for sensing an orientation angle of the receiver magnet relative to the first time-varying magnetic field.

10. A receiver according to claim 9 comprising a controller connected to receive one or more signals from the one or more magnetic field sensors, configured to estimate the orientation angle of the receiver magnet relative to the first time-varying magnetic field and connected to emit an output signal if the estimated orientation angle is greater than a threshold.

11. A receiver according to claim 1 comprising one or more magnetic field sensors configured for sensing an intensity of the first-time varying magnetic field.

12. A receiver according to claim 11 comprising a controller connected to receive one or more signals from the one or more magnetic field sensors, configured to estimate the intensity of the first-time varying magnetic field and connected to emit an output signal if the estimated intensity is one or more of: greater than a first threshold; and less than a second threshold.

13. A receiver according to claim 1 wherein the conductor is electrically connected to a battery and wherein the receiver comprises one or more electrical charge sensors configured for sensing a charge of the battery.

14. A receiver according to claim 13 comprising a controller connected to receive one or more signals from the one or more electrical charge sensors, configured to estimate the charge of the battery and connected to emit an output signal if the estimated charge is greater than or equal to a threshold.

15. A power transfer apparatus comprising:
a transmitter for generating a first time varying magnetic field, at least a spatial orientation of the time varying magnetic field varying in direction with respect to time; and
a receiver separated from the transmitter by a gap, the receiver comprising:
a conductor; and
a receiver support and a receiver magnet moveably mounted to the receiver support by a rotational coupling which permits unrestricted rotational motion of the receiver magnet relative to the support about a rotation axis, the receiver magnet located in the first time varying magnetic field and the receiver magnet moveable relative to the receiver support in response to the first time varying magnetic field;
wherein the conductor and receiver magnet are positioned relative to one another such that movement of the receiver magnet creates a second time-varying magnetic field in a vicinity of the conductor to thereby induce current in the conductor.

16. An apparatus according to claim 15 wherein the receiver magnet is moveably mounted to the receiver support by a rotational coupling connected between the receiver support and the receiver magnet to permit unrestricted rotational motion of the receiver magnet relative to the receiver support about a rotation axis in response to the first time-varying magnetic field and wherein a ratio of a length of the gap to a maximum radius of motion of the receiver magnet is greater than or equal to 1.

17. An apparatus according to claim 15 wherein a non-magnetic barrier is located in the gap between the transmitter and receiver.

18. An apparatus according to claim 17 wherein the non-magnetic barrier comprises a metallic barrier.

19. An apparatus according to claim 15 wherein the transmitter comprises a transmitter support and a transmitter magnet moveably mounted to the transmitter support for movement relative to the transmitter support, the motion of the transmitter magnet creating the first time-varying magnetic field.

20. An apparatus according to claim 19 wherein the transmitter magnet is moveably mounted to the transmitter support by a first rotational coupling connected between the transmitter support and the transmitter magnet to permit unrestricted rotational motion of the transmitter magnet relative to the transmitter support about a rotation axis.

21. An apparatus according to claim 20 further comprising a second rotational coupling connected between the receiver support and the receiver magnet to permit unrestricted rotational motion of the receiver magnet relative to the receiver support about a rotation axis in response to the first time-varying magnetic field and wherein the rotation axes of transmitter magnet and receiver magnet are parallel to within ±20°.

22. An apparatus according to claim 20 wherein the transmitter magnet comprises a dipole magnet oriented with its magnetic dipole vector orthogonal to within ±20° to the rotation axis of the transmitter magnet.

23. An apparatus according to claim 20 wherein the first rotational coupling comprises one or more of: ceramic ball bearings; jewel bearings; and other rotational bearings.

24. An apparatus according to claim 19 wherein the transmitter magnet comprises a dipole permanent magnet.

25. An apparatus according to claim 19 wherein the transmitter comprises one or more magnetic field sensors configured for sensing a slip angle comprising a phase difference between periodic movement of the transmitter magnet and corresponding periodic motion of the receiver magnet.

26. An apparatus according to claim 25 comprising a controller connected to receive one or more signals from the one or more magnetic field sensors, configured to estimate the slip angle and to control connected to emit an output signal which controls movement of the transmitter magnet in response to the estimated slip angle and thereby maintains a slip angle for which positive work is transmitted to a load electrically connected to the conductor.

27. An apparatus according to claim 19 wherein transmitter comprises one or more magnetic field sensors configured for sensing an orientation angle of the receiver magnet relative to the transmitter magnet.

28. An apparatus according to claim 27 comprising a controller connected to receive one or more signals from the one or more magnetic field sensors, configured to estimate the orientation angle of the receiver magnet relative to the transmitter magnet and connected to emit an output signal if the estimated orientation angle is greater than a threshold.

29. An apparatus according to claim 19 wherein the transmitter comprises one or more magnetic field sensors configured for sensing an intensity of the second time-varying magnetic field created by the receiver magnet.

30. An apparatus according to claim 29 comprising a controller connected to receive one or more signals from the one or more magnetic field sensors, configured to determine the intensity of the second time-varying magnetic field and connected to emit an output signal if the estimated intensity is one or more of: greater than a first threshold; and less than a second threshold.

31. An apparatus according to claim 15 comprising one or more RFID proximity sensors, the RFID proximity sensors located in one or more of: the transmitter and the receiver.

32. An apparatus according to claim 15 wherein the conductor is electrically connected to a battery and wherein the transmitter comprises one or more electrical charge sensors configured for sensing a charge of the battery.

33. An apparatus according to claim 32 wherein the one or more electrical charge sensors are located at the transmitter and configured to detect power associated with generating the first time varying magnetic field.

34. An apparatus according to claim 33 comprising a controller connected to receive one or more signals from the one or more electrical charge sensors, configured to estimate the charge of the battery and connected to emit an output signal if the estimated charge is greater than or equal to a threshold.

35. A power transfer apparatus comprising:
a transmitter for generating a first time varying magnetic field, at least a spatial orientation of the time varying magnetic field varying in direction with respect to time;
a receiver separated from the transmitter by a gap, the receiver comprising a moveable receiver magnet located in first time varying magnetic field; and
means for converting mechanical energy of the receiver magnet's motion into another form of energy;
wherein the receiver further comprises a support and the receiver magnet is moveably mounted to the support for unrestricted rotational motion of the receiver magnet relative to the support about a rotation axis in response to the first time-varying magnetic field and wherein a ratio of a length of the gap to a maximum radius of motion of the receiver magnet is greater than or equal to 1.

36. A method delivering charge to an electrical load, the method comprising:
locating a receiver magnet in a first time varying magnetic field;
supporting the receiver magnet for movement, the receiver magnet moving with unrestricted rotational motion about a rotation axis in response to the first time varying magnetic field;
positioning a coil comprising one or more turns relative to the receiver magnet such that movement of the receiver magnet creates a second time varying magnetic field in a vicinity of the coil to thereby induce current in the coil; and
electrically connecting the coil to the load.

37. A method according to claim 36 wherein the first time-varying magnetic field is periodic and locating the receiver magnet in the first time-varying magnetic field comprises subjecting the receiver magnet to a resultant periodic torque, the thereby causing, by the torque, periodic motion of the receiver magnet with a period that matches a period of the first time-varying magnetic field.

38. A method according to claim 36 wherein the load comprises a battery and the method further comprises:
detecting a charge of the battery; and
decoupling the electrical connection between the coil and the load when the charge of the battery is greater than a threshold.

\* \* \* \* \*